(12) United States Patent
Kim et al.

(10) Patent No.: US 9,750,073 B2
(45) Date of Patent: Aug. 29, 2017

(54) DEVICE AND METHOD FOR CONCURRENT CALL AVOIDANCE

(71) Applicant: SK TELECOM CO., LTD., Seoul (KR)

(72) Inventors: Namgun Kim, Seoul (KR); Jintae Choi, Seoul (KR); Changmoon Han, Seoul (KR); Seongsoo Bae, Seongnam-si (KR)

(73) Assignee: SK TELECOM CO., LTD., Seoul (KR)

( * ) Notice: Subject to any disclaimer, the term of this patent is extended or adjusted under 35 U.S.C. 154(b) by 76 days.

(21) Appl. No.: 14/224,492

(22) Filed: Mar. 25, 2014

(65) Prior Publication Data

US 2014/0204839 A1    Jul. 24, 2014

Related U.S. Application Data

(63) Continuation of application No. PCT/KR2012/007718, filed on Sep. 25, 2012.

(30) Foreign Application Priority Data

Oct. 12, 2011 (KR) .......... 10-2011-0104268
Oct. 12, 2011 (KR) .......... 10-2011-0104270

(51) Int. Cl.
*H04W 76/04* (2009.01)
*H04W 76/02* (2009.01)
*H04W 24/02* (2009.01)

(52) U.S. Cl.
CPC ......... *H04W 76/045* (2013.01); *H04W 24/02* (2013.01); *H04W 76/025* (2013.01); *H04W 76/027* (2013.01); *H04W 76/04* (2013.01)

(58) Field of Classification Search
CPC .............. H04W 76/045; H04W 24/02; H04W 76/027; H04W 76/025
See application file for complete search history.

(56) References Cited

U.S. PATENT DOCUMENTS

2006/0153129 A1*  7/2006  Nee ............ H04W 36/02
                                                      370/329
2007/0298848 A1   12/2007  Babin
(Continued)

FOREIGN PATENT DOCUMENTS

KR    1020050022465 A    3/2005
KR      20110086748 A    7/2011

OTHER PUBLICATIONS

Korean Office Action for application No. 10-2011-0104268 dated Feb. 25, 2014.
(Continued)

*Primary Examiner* — Omer S Mian
(74) *Attorney, Agent, or Firm* — Hauptman Ham, LLP (57) ABSTRACT

Disclosed herein are a terminal device including: a state determining unit to determine a connection state of a voice call or a data call at a specific time prior to a transfer period of a keep-alive message designated to a specific application; and an application interworking unit to transfer the keep-alive message through the data call according to the determined connection state of the voice call or the data call to notify of a driving state of the specific application.

7 Claims, 6 Drawing Sheets

(56) References Cited

U.S. PATENT DOCUMENTS

| | | | |
|---|---|---|---|
| 2010/0023788 A1* | 1/2010 | Scott | G06F 1/3209 |
| | | | 713/320 |
| 2010/0322124 A1 | 12/2010 | Luoma et al. | |
| 2010/0323728 A1 | 12/2010 | Gould et al. | |
| 2011/0093542 A1 | 4/2011 | Lau et al. | |
| 2012/0264397 A1* | 10/2012 | Meredith et al. | 455/410 |
| 2012/0264416 A1* | 10/2012 | Pica et al. | 455/422.1 |
| 2012/0302223 A1* | 11/2012 | Austin et al. | 455/418 |
| 2012/0309375 A1* | 12/2012 | Austin | H04W 4/001 |
| | | | 455/418 |

OTHER PUBLICATIONS

International Search Report mailed Mar. 18, 2013 for PCT/KR2012/007718.

* cited by examiner

DEVICE AND METHOD FOR CONCURRENT CALL AVOIDANCE

CROSS-REFERENCE TO RELATED APPLICATION

The present application is a continuation of International Application No. PCT/KR2012/007718 filed on Sep. 25, 2012, which is based on, and claims priorities from, KR Application Serial Number 10-2011-0104268, filed on Oct. 12, 2011 and KR Application Serial Number 10-2011-0104270, filed on Oct. 12, 2011. The disclosures of the above-listed applications are hereby incorporated by reference herein in their entirety.

FIELD

The present disclosure relates to a device and a method for concurrent call avoidance.

BACKGROUND

The statements in this section merely provide background information related to the present disclosure and do not constitute prior art.

In recent years, as a smart phone has been vitalized, various sorts of applications have appeared. Among the applications, an application such as a messenger requiring functions of receiving and sending packets is increasing. In particular, in a case of an application in the form of the messenger, a corresponding server should always know a location of a user terminal device loaded with the application for the packet receiving function, and to this end, a session is maintained between the terminal device and a server.

A push notification (hereinafter, referred to as PN) technology of notifying, at a time of data reception, the fact that a message has been transferred to an application requiring the reception is being applied to the application in the form of the messenger. That is, the PN technology refers to a technology by which, when a loaded application of user terminal device A is connected with a server and transfers to the server the fact that there is a message which will be sent to user terminal device B, the server searches for a session of user terminal device B and transfers to user terminal device B a push notification that there is a message which user terminal device A has sent, and user terminal device B can identify the message which user terminal device A has sent when recognizing the push notification.

Moreover, in the case of the application in the form of the messenger, a keep-alive message is transferred from the terminal device to the server according to a predetermined period for the sake of maintaining the session between the terminal device and the server, and the server transfers an ACK message to the terminal device after recognizing the keep-alive message.

The inventor(s), however, has experienced that in the case of the application in the form of the messenger as described above, since the push notification and the keep-alive message are applied by using the data call, a concurrent call (or Multi-RAB) state in which a voice call and a data call are simultaneously performed is increased, and since the data call exerts a larger influence (a decrease in coverage according to an increase in required power) on a network quality than the voice call, a voice call drop is caused by the increase in the concurrent call.

Moreover, the inventor(s) has experienced that as recently there are increases in sorts and the number of the applications in the form of the messenger and the applications requiring the keep-alive message transmission using the data call for the sake of maintaining the session, an attempt for the data call connection is increased according to driving of the corresponding application to overload the network.

SUMMARY

In accordance with another aspect of the present disclosure, a terminal device comprises a state determining unit and an application interworking unit. The state determining unit is configured to determine a connection state of a voice call or a data call at a specific time prior to a transfer period of a keep-alive message designated to a specific application. And the application interworking unit is configured to transfer the keep-alive message through the data call according to the determined connection state of the voice call or the data call to notify of a driving state of the specific application.

In accordance with another aspect of the present disclosure, a terminal device for avoiding a concurrent call is configured to determine a connection state of a voice call or a data call at a specific time prior to a transfer period of a keep-alive message designated to a specific application, transfer the keep-alive message to a server device through the data call according to the determined connection state of the voice call or the data call to notify the server device of a driving state of the specific application, and receive an acknowledgement message transferred by the server device in response to the keep-alive message.

In accordance with another aspect of the present disclosure, a terminal device for operating a terminal device is configured to determine a connection state of a voice call or a data call at a specific time prior to a transfer period of a keep-alive message designated to a specific application, and transfer the keep-alive message to a server device through the data call according to the determined connection state of the voice call or the data call to notify the server device of a driving state of the specific application.

DETAILED DESCRIPTION

Hereinafter, embodiments of the present disclosure will be described with reference to the accompanying drawings. A configuration of the present disclosure and an action effect according to the configuration will be clearly understood through the following detailed description. Prior to the detailed description, the same elements will be designated by the same reference numerals although they are shown in different drawings, and a detailed description of known functions and configurations incorporated herein will be omitted when it makes the subject matter of the present disclosure rather unclear.

Figure 1:
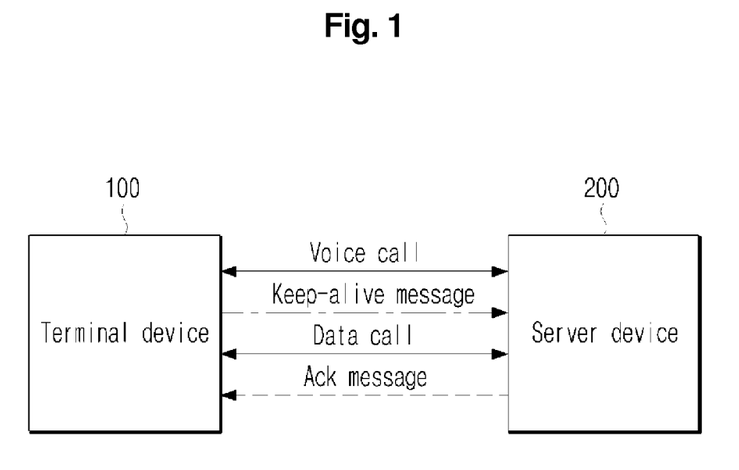
FIG. 1 is a block diagram of a configuration of a concurrent call avoidance system according to at least one embodiment of the present disclosure.

FIG. 1 is a block diagram of a configuration of a concurrent call avoidance system according to at least one embodiment of the present disclosure.

As shown in FIG. 1, the concurrent call avoidance system includes a terminal device 100 transferring a keep-alive message for notifying of a driving state of a specific application, and a server device 200 transferring, to the terminal device 100, an acknowledgement (ACK) message in response to reception of the keep-alive message transferred from the terminal device 100. Here, the specific application refers to a client application managed by the server device 200, for example, an application in the form of a messenger, and in the case of the specific application, the keep-alive message is required to be transferred from the terminal device 100 to the server device 200 according to a predetermined period interval for the sake of maintaining a session between the terminal device 100 and the server device 200.

The terminal device 100 determines a current state thereof according to period information designated to the embedded specific application.

The terminal device 100 determines the period information designated to the embedded specific application, that is, a basic period (or "transfer period", hereinafter "basic period" shall be used for illustrative purposes and not to be considered as limitations of the present disclosure) designated to notify of the driving state of the specific application, set a detection period corresponding to a time prior to the basic period on the basis of the determined basic period, and determine the current state thereof, that is, a voice call connection state according to the detection period. In this regard, the terminal device 100 determines the voice call connection state through an Application Programming Interface (API) supported by a platform, for example, Android or Windows, loaded for an operation of the terminal device.

For example, when the basic period corresponding to the period information designated to the specific application is set to a time interval of 50 minutes, the terminal device 100 sets five minutes before the basic period passes as a detection period, and determine the voice call connection state once, continuously, or by the number of times being set, according to the detection period through the API supported by the platform loaded for the operation of the terminal device.

Moreover, when it is determined that the current state does not correspond to the voice call connection state, the terminal device 100 transfers the keep-alive message to the server device 200.

In other words, when it is determined through the API supported by the platform that the current state does not correspond to the voice call connection state, the terminal device 100 transfers the keep-alive message corresponding to the specific application through a data call to notify the server device 200 of the driving state of the specific application, and receive the ACK message corresponding to the keep-alive message from the server device 200.

Meanwhile, when the basic period designated to the specific application has come, the terminal device 100 transfers the keep-alive message through the data call irrespective of the voice call connection state to maintain the session connected with the server device 200.

Figure 2:
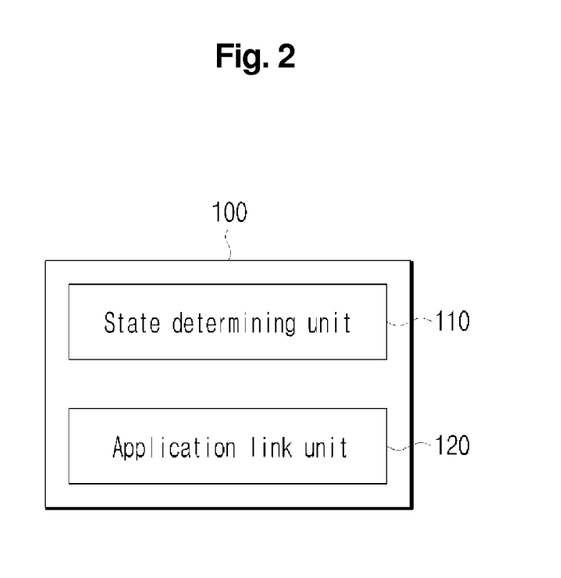
FIG. 2 is a block diagram of a configuration of a terminal device according to at least one embodiment of the present disclosure.

Hereinafter, the terminal device 100 will be described in more detail with reference to FIG. 2.

The terminal device 100 includes a state determining unit 110 configured to determine a current state of the terminal device, and an application interworking unit 120 configured to transfer a keep-alive message corresponding to a specific application to notify of a driving state of the specific application.

The state determining unit 110 sets a detection period according to period information designated to the embedded specific application.

In other words, the state determining unit 110 determines the period information designated to the embedded specific application, that is, a basic period (i.e., transfer period) designated to notify of the driving state of the specific application, and set the detection period corresponding to a time prior to the basic period on the basis of the determined basic period.

Moreover, the state determining unit 110 determines the current state of the terminal device 100 according to the set detection period.

In other words, the state determining unit 110 determines the current state of the terminal device 100, that is, a voice call connection state according to the set detection period. In this regard, the state determining unit 110 determines the voice call connection state through an Application Programming Interface (API) supported by a platform, for example, Android or Windows, loaded for an operation of the terminal device. For example, when the basic period corresponding to the period information designated to the specific application is set to a time interval of 50 minutes, the state determining unit 110 determines the voice call connection state once, continuously, or by the number of times being set, according to the detection period corresponding to five minutes before the basic period passes through the API supported by the platform loaded for the operation of the terminal device.

When it is determined that the current state does not correspond to the voice call connection state, the application interworking unit 120 transfers the keep-alive message to the server device 200.

In other words, when it is determined through the API supported by the platform that the current state does not correspond to the voice call connection state, the application interworking unit 120 transfers the keep-alive message corresponding to the specific application through a data call to notify the server device 200 of the driving state of the specific application, and receive the ACK message corresponding to the keep-alive message from the server device 200.

Meanwhile, when the basic period designated to the specific application has come, the application interworking unit 120 transfers the keep-alive message through the data call irrespective of the voice call connection state to maintain the session connected with the server device 200.

As described above, in the concurrent call avoidance system, when it is determined that the current state of the terminal device does not correspond to the voice call connection state, the keep-alive message for the sake of maintaining the session between the terminal device and the server device is transferred to the server device so that a concurrent call (or Multi-RAB) state in which a voice call and a data call are simultaneously performed is minimized, in which a voice call drop phenomenon due to an increase in the concurrent call can be prevented, and thus a deterioration of a voice call quality can be reduced.

Hereinafter, a method of avoiding a concurrent call according to at least one embodiment of the present disclosure will be described with reference to FIGS. 3 and 4 related to a voice call connection. Here, for convenience of description, the elements shown in FIGS. 1 and 2 will be described with the corresponding reference numerals.

First, a method of operating a concurrent call avoidance system will be described with reference to FIG. 3.

A terminal device 100 determines a current state thereof according to period information designated to an embedded specific application (S110 to S140).

Preferably, the terminal device 100 determines the period information designated to the embedded specific application, that is, a basic period designated to notify of a driving state of the specific application, set a detection period corresponding to a time prior to the basic period on the basis of the determined basic period, and determine the current state thereof, that is, a voice call connection state according to the detection period. In this regard, the terminal device 100 determines the voice call connection state through an Application Programming Interface (API) supported by a platform, for example, Android or Windows, loaded for an operation of the terminal device.

For example, when the basic period corresponding to the period information designated to the specific application is set to a time interval of 50 minutes, the terminal device 100 sets five minutes before the basic period passes as a detection period, and determine the voice call connection state once, continuously, or by the number of times being set, according to the detection period through the API supported by the platform loaded for the operation of the terminal device.

Then, when it is determined that the current state does not correspond to the voice call connection state, the terminal device 100 transfers the keep-alive message to a server device 200 (S150).

In other words, when it is determined through the API supported by the platform that the current state does not correspond to the voice call connection state, the terminal device 100 transfers the keep-alive message corresponding to the specific application through a data call to notify the server device 200 of the driving state of the specific application.

Meanwhile, when the basic period designated to the specific application has come, the terminal device 100 transfers the keep-alive message through the data call irrespective of the voice call connection state to maintain the session connected with the server device 200.

Thereafter, the server device 200 transfers an ACK message to the terminal device 100 in response to reception of the keep-alive message transferred from the terminal device 100 (S160).

Hereinafter, a method of operating the terminal device 100 will be described with reference to FIG. 4.

First, a detection period is set according to period information designated to an embedded specific application (S210 and S220).

Preferably, a state determining unit 110 determines period information designated to the embedded specific application, that is, a basic period designated to notify of a driving state of the specific application, and set a detection period corresponding to a time prior to the basic period on the basis of the determined basic period.

Then, a current state of the terminal device 100 is determined according to the set detection period (S230 to S250).

Preferably, the state determining unit 110 determines the current state of the terminal device 100, that is, a voice call connection state according to the set detection period. In this regard, the state determining unit 110 determines the voice call connection state through an Application Programming Interface (API) supported by a platform, for example, Android or Windows, loaded for an operation of the terminal device. For example, when the basic period corresponding to the period information designated to the specific application is set to a time interval of 50 minutes, the state determining unit 110 determines the voice call connection state once, continuously, or by the number of times being set, according to the detection period corresponding to five minutes before the basic period passes through the API supported by the platform loaded for the operation of the terminal device.

Then, when it is determined that the current state does not correspond to the voice call connection state, a keep-alive message is transferred to a server device 200 (S260 to S280).

Preferably, when it is determined through the API supported by the platform that the current state does not correspond to the voice call connection state, an application interworking unit 120 transfers the keep-alive message corresponding to the specific application through a data call to notify the server device 200 of the driving state of the specific application, and receive the ACK message corresponding to the keep-alive message from the server device 200.

Meanwhile, when the basic period designated to the specific application has come ("Yes" at S240), the application interworking unit 120 transfers the keep-alive message through the data call irrespective of the voice call connection state to maintain the session connected with the server device 200 (from S240 to S270).

Figure 3:
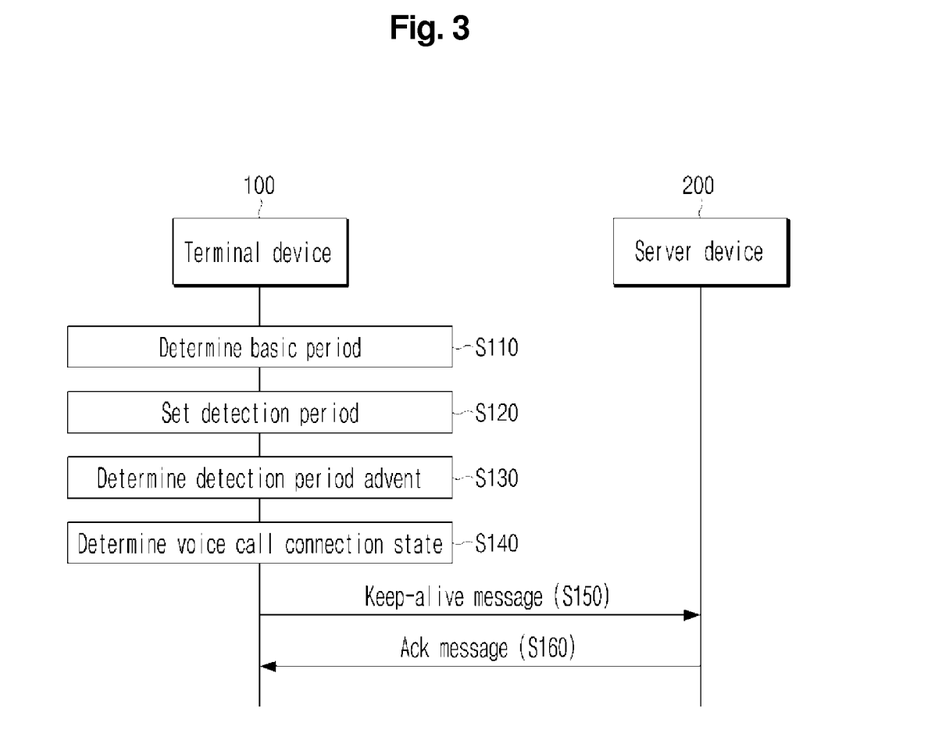
FIG. 3 is a signal flow diagram of a method of operating a concurrent call avoidance system according to at least one embodiment of the present disclosure.
Figure 4:
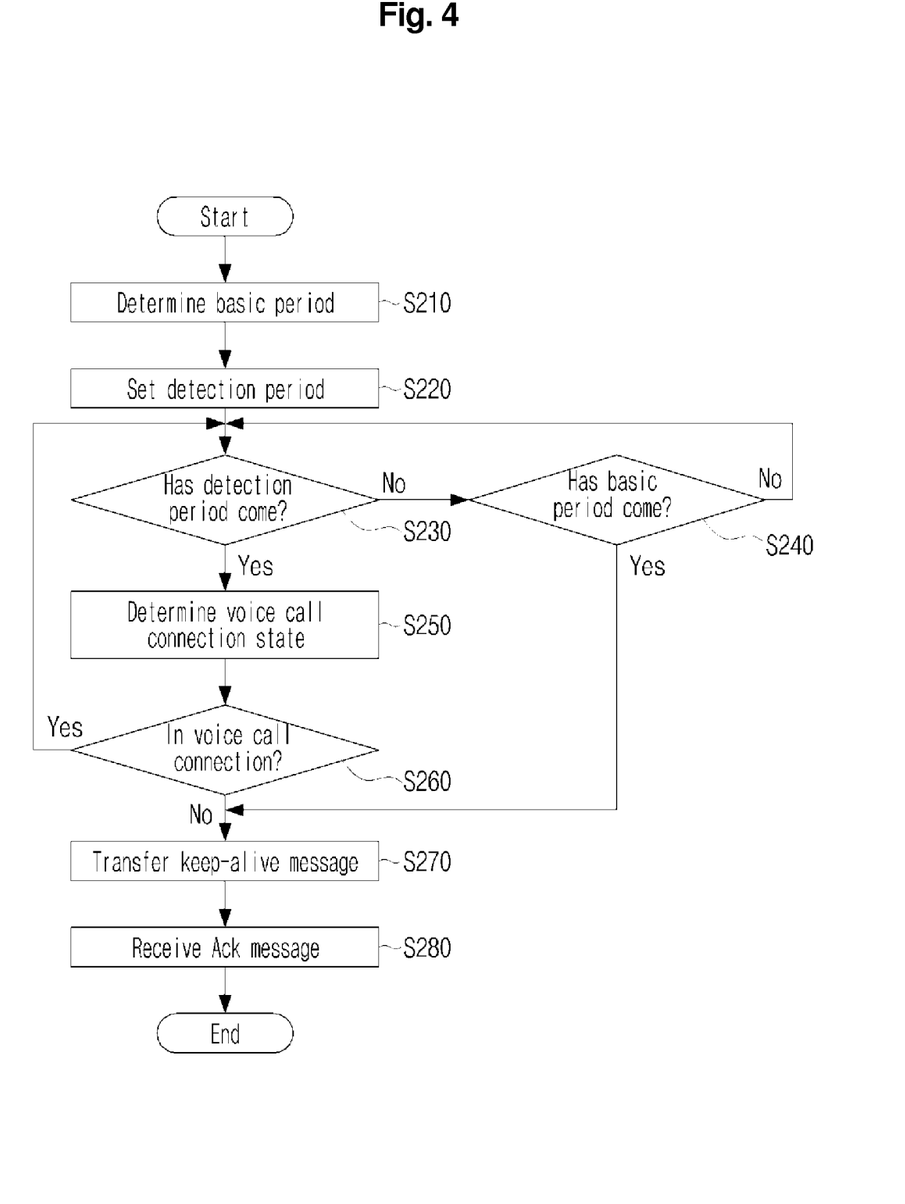
FIG. 4 is a flowchart of an operation of a terminal device according to at least one embodiment of the present disclosure.

As described above, in the method of avoiding the concurrent call according to the at least one embodiment related to FIGS. 3 and 4, when it is determined that the current state of the terminal device does not correspond to the voice call connection state, the keep-alive message for the sake of maintaining the session between the terminal device and the server device is transferred to the server device so that a concurrent call (or Multi-RAB) state in which a voice call and a data call are simultaneously performed is minimized, in which a voice call drop phenomenon due to an increase in the concurrent call can be prevented, and thus a deterioration of a voice call quality can be reduced.

Hereinafter, a schematic configuration of a concurrent call avoidance system according to another embodiment of the present disclosure will be described with reference to FIG. 1.

As shown in FIG. 1, the concurrent call avoidance system according to the another embodiment of the present disclosure includes a terminal device 100 transferring a keep-alive message for notifying of a driving state of a specific application, and a server device 200 transferring, to the terminal device 100, an acknowledgement (ACK) message in response to reception of the keep-alive message transferred from the terminal device 100. Here, the specific application refers to a client application managed by the server device 200, for example, an application in the form of a messenger. In the case of the specific application, a push notification (hereinafter, referred to as PN) technology of notifying, at the time of data reception, the fact that a message has been transferred to an application requiring reception is applied, and the keep-alive message is required to be transferred from the terminal device 100 to the server device 200 according to a predetermined period interval for the sake of maintaining a session between the terminal device 100 and the server device 200.

The terminal device 100 determines a current state thereof according to period information designated to the embedded specific application.

The terminal device 100 determines the period information designated to the embedded specific application, that is, a basic period designated to notify of the driving state of the specific application, and set a detection period corresponding to a time prior to the basic period on the basis of the determined basic period. Moreover, the terminal device 100 determines the current state thereof, that is, a data call connection state according to the set detection period. In this regard, the terminal device 100 determines the data call connection state through an Application Programming Interface (API) supported by a platform, for example, Android or Windows, loaded for an operation of the terminal device.

For example, when the basic period corresponding to the period information designated to the specific application is set to a time interval of 50 minutes, the terminal device 100 sets five minutes before the basic period passes as a detection period, and determine the data call connection state once, continuously, or by the number of times being set, according to the detection period through the API supported by the platform loaded for the operation of the terminal device.

In this event, the determined data call connection state is classified into a data call connected state and a data call unconnected state. The data call connected state includes a state (DATA_ACTIVITY_IN) in which a wireless link is connected and there is only reception traffic, a state (DATA_ACTIVITY_INOUT) in which a wireless link is connected and there is transmission/reception traffic, a state (DATA_ACTIVITY_NONE) in which a wireless link is connected but there is no transmission/reception traffic, and a state (DATA_ACTIVITY_OUT) in which a wireless link is connected and there is only transmission traffic. The data call unconnected state includes a state (DATA_ACTIVITY_DORMANT) in which there is a data connection but a wireless link is not connected.

Moreover, when it is determined that the current state corresponds to the data call connected state, the terminal device 100 transfers the keep-alive message to the server device 200.

In other words, when it is determined through the API supported by the platform that the current state corresponds to the data call connected state, the terminal device 100 transfers the keep-alive message corresponding to the specific application through the connected data call to notify the server device 200 of the driving state of the specific application, and receive the ACK message corresponding to the keep-alive message from the server device 200.

Meanwhile, when the basic period designated to the specific application has come, the terminal device 100 transfers the keep-alive message through the data call irrespective of the data call connection state to maintain the session connected with the server device 200.

In other words, in the state in which the basic period designated to the specific application has come, in the case of the data call connected state, that is, the state (DATA_ACTIVITY_IN) in which the wireless link is connected and there is only the reception traffic, the state (DATA_ACTIVITY_INOUT) in which the wireless link is connected and there is the transmission/reception traffic, the state (DATA_ACTIVITY_NONE) in which the wireless link is connected but there is no transmission/reception traffic, and the state (DATA_ACTIVITY_OUT) in which the wireless link is connected and there is only the transmission traffic, the terminal device 100 transfers the keep-alive message through the connected data call. Moreover, in the state in which the basic period designated to the specific application has come, in the case of the data call unconnected state, that is, the state (DATA_ACTIVITY_DORMANT) in which there is the data connection but the wireless link is not connected, the terminal device 100 performs a new data call connection to transfer the keep-alive message through the corresponding data call.

The server device 200 transfers the ACK message to the terminal device 100 in response to reception of the keep-alive message transferred from the terminal device 100.

In other words, the server device 200 transfers the ACK message to the terminal device 100 in correspondence to the keep-alive message received from the terminal device 100 according to the detection period corresponding to the time prior to the basic period designated to the specific application, or the basic period designated to the specific application, thereby replying to the terminal device 100 that the driving state of the specific application has been recognized.

Hereinafter, a terminal device 100 according to another embodiment of the present disclosure will be described in more detail with reference to FIG. 2.

The terminal device 100 includes a state determining unit 110 configured to determine a current state of the terminal device, and an application interworking unit 120 configured to transfer a keep-alive message corresponding to a specific application to notify of a driving state of the specific application. Other components of the terminal device 100, such as the state determining unit 110 and the application interworking unit 120 are implemented by one or more processors and/or application-specific integrated circuits (ASICs).

The state determining unit 110 determines the current state of the terminal device according to period information designated to the embedded specific application.

In other words, the state determining unit 110 determines the period information designated to the embedded specific application, that is, a basic period designated to notify of the driving state of the specific application, and set a detection period corresponding to a time prior to the basic period on the basis of the determined basic period.

Moreover, the state determining unit 110 determines the current state of the terminal device 100, that is, a data call connection state according to the set detection period. In this regard, the terminal device 100 determines the data call connection state through an Application Programming Interface (API) supported by a platform, for example, Android or Windows, loaded for an operation of the terminal device.

For example, when the basic period corresponding to the period information designated to the specific application is set to a time interval of 50 minutes, the state determining unit 110 sets five minutes before the basic period passes as a detection period, and determine the data call connection state once, continuously, or by the number of times being set, according to the detection period through the API supported by the platform loaded for the operation of the terminal device.

In this event, the determined data call connection state is classified into a data call connected state and a data call unconnected state. The data call connected state includes a state (DATA_ACTIVITY_IN) in which a wireless link is connected and there is only reception traffic, a state (DATA_ACTIVITY_INOUT) in which a wireless link is connected and there is transmission/reception traffic, a state (DATA_ACTIVITY_NONE) in which a wireless link is connected but there is no transmission/reception traffic, and a state (DATA_ACTIVITY_OUT) in which a wireless link is connected and there is only transmission traffic. The data call unconnected state includes a state (DATA_ACTIVITY_DORMANT) in which there is a data connection but a wireless link is not connected.

When it is determined that the current state corresponds to the data call connection state, the application interworking unit 120 transfers the keep-alive message to the server device 200.

In other words, when it is determined through the API supported by the platform that the current state corresponds to the data call connection state, the application interworking unit 120 transfers the keep-alive message corresponding to the specific application through the connected data call to notify the server device 200 of the driving state of the specific application, and receive the ACK message corresponding to the keep-alive message from the server device 200.

Meanwhile, when the basic period designated to the specific application has come, the application interworking unit 120 transfers the keep-alive message through the data call irrespective of the data call connection state.

In other words, in the state in which the basic period designated to the specific application has come, in the case of the data call connected state, that is, the state (DATA_ACTIVITY_IN) in which the wireless link is connected and there is only the reception traffic, the state (DATA_ACTIVITY_INOUT) in which the wireless link is connected and there is the transmission/reception traffic, the state (DATA_ACTIVITY_NONE) in which the wireless link is connected but there is no transmission/reception traffic, and the state (DATA_ACTIVITY_OUT) in which the wireless link is connected and there is only the transmission traffic, the application interworking unit 120 transfers the keep-alive message through the connected data call. Moreover, in the state in which the basic period designated to the specific application has come, in the case of the data call unconnected state, that is, the state (DATA_ACTIVITY_DORMANT) in which there is the data connection but the wireless link is not connected, the application interworking unit 120 performs a new data call connection to transfer the keep-alive message through the corresponding data call.

As described above, according to the concurrent call avoidance system in accordance with the another embodiment of the present disclosure, in transferring the keep-alive message for the sake of maintaining the session between the terminal device and the server device, when the data call connection state is determined prior to the set period for transferring the keep-alive message, the keep-alive message is transferred, whereby an attempt for the data call connection is minimized so that network loads can be reduced.

Figure 5:
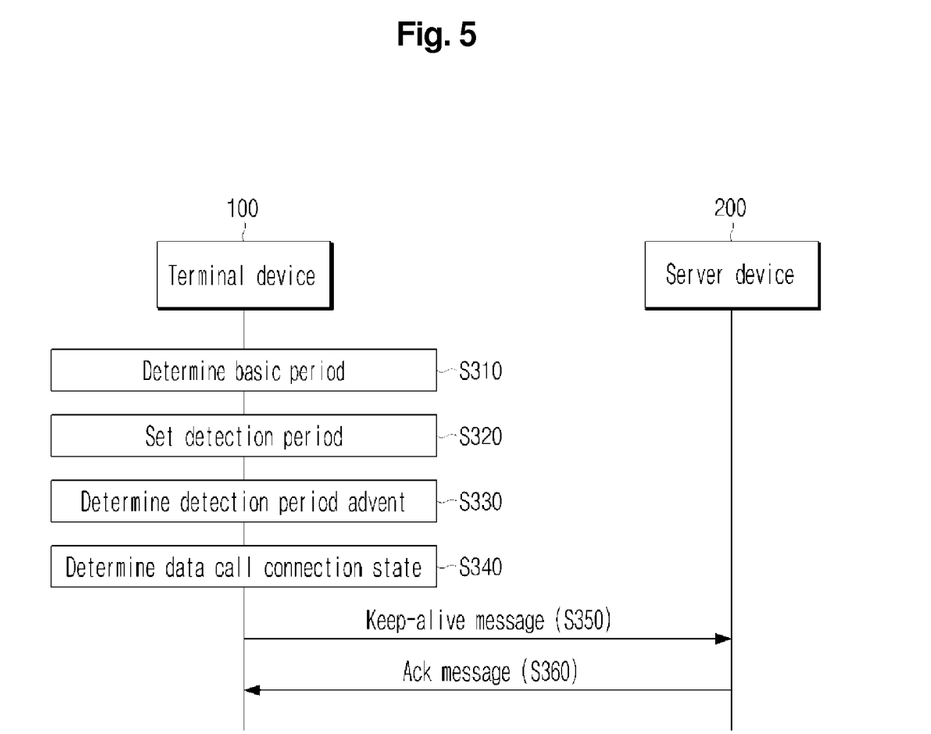
FIG. 5 is a signal flow diagram of a method of operating a concurrent call avoidance system according to another embodiment of the present disclosure.
Figure 6:
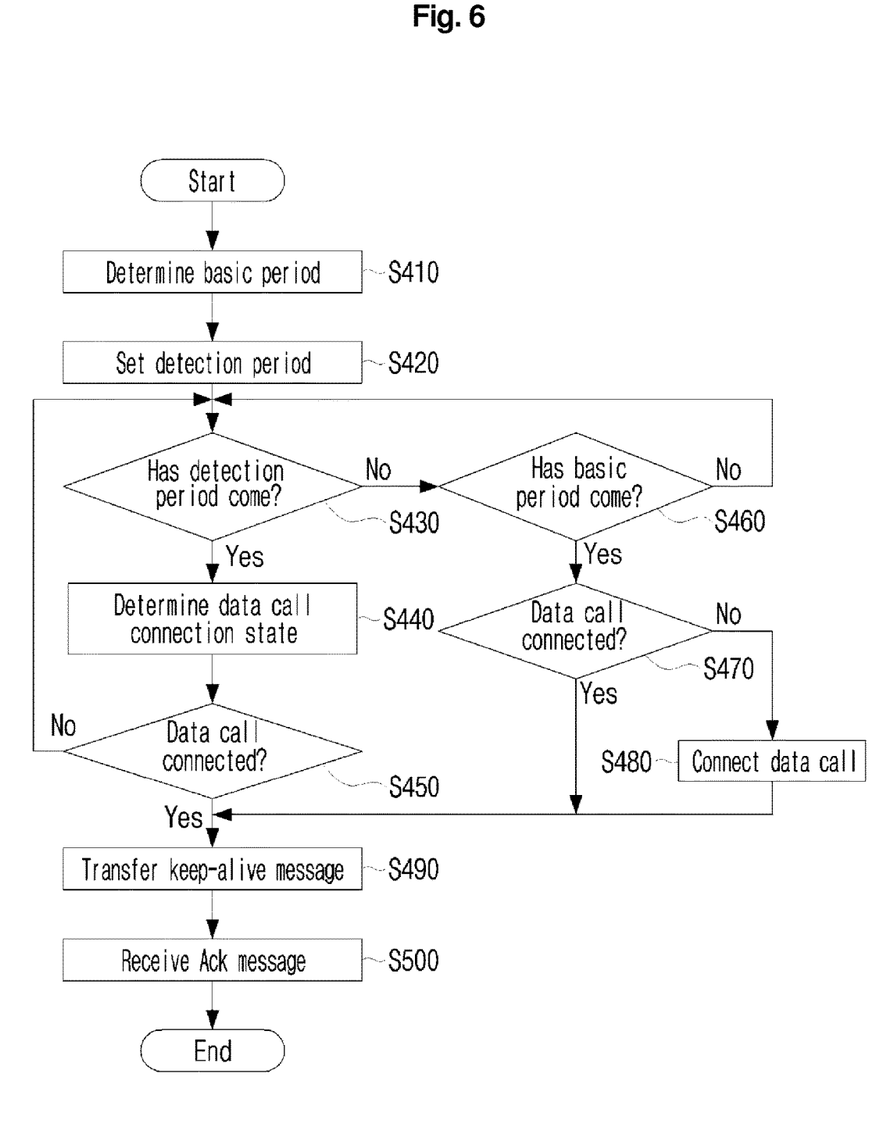
FIG. 6 is a flowchart of an operation of a terminal device according to another embodiment of the present disclosure.

Hereinafter, a method of avoiding a concurrent call according to another embodiment of the present disclosure will be described with reference to FIGS. 5 and 6. Here, for convenience of description, the elements shown in FIGS. 1 and 2 will be described with the corresponding reference numerals.

First, a method of operating a concurrent call avoidance system according to the another embodiment of the present disclosure will be described with reference to FIG. 5.

A terminal device 100 determines a current state thereof according to period information designated to an embedded specific application (S310 to S340).

Preferably, the terminal device 100 determines the period information designated to the embedded specific application, that is, a basic period designated to notify of a driving state of the specific application, and set a detection period corresponding to a time prior to the basic period on the basis of the determined basic period.

Moreover, the terminal device 100 determines the current state thereof, that is, a data call connection state according to the set detection period. In this regard, the terminal device 100 determines the data call connection state through an Application Programming Interface (API) supported by a platform, for example, Android or Windows, loaded for an operation of the terminal device.

For example, when the basic period corresponding to the period information designated to the specific application is set to a time interval of 50 minutes, the terminal device 100 sets five minutes before the basic period passes as a detection period, and determine the data call connection state once, continuously, or by the number of times being set, according to the detection period through the API supported by the platform loaded for the operation of the terminal device.

In this event, the determined data call connection state is classified into a data call connected state and a data call unconnected state. The data call connected state includes a state (DATA_ACTIVITY_IN) in which a wireless link is connected and there is only reception traffic, a state (DATA_ACTIVITY_INOUT) in which a wireless link is connected and there is transmission/reception traffic, a state (DATA_ACTIVITY_NONE) in which a wireless link is connected but there is no transmission/reception traffic, and a state (DATA_ACTIVITY_OUT) in which a wireless link is connected and there is only transmission traffic. The data call unconnected state includes a state (DATA_ACTIVITY_DORMANT) in which there is a data connection but a wireless link is not connected.

Then, when it is determined that the current state corresponds to the data call connection state, the terminal device 100 transfers the keep-alive message to a server device 200 (S350).

Preferably, when it is determined through the API supported by the platform that the current state corresponds to the data call connection state, the terminal device 100 transfers the keep-alive message corresponding to the specific application through the connected data call to notify the server device 200 of the driving state of the specific application.

Meanwhile, when the basic period designated to the specific application has come, the terminal device 100 transfers the keep-alive message through the data call irrespective of the data call connection state.

In other words, in the state in which the basic period designated to the specific application has come, in the case of the data call connected state, that is, the state (DATA_ACTIVITY_IN) in which the wireless link is connected and there is only the reception traffic, the state (DATA_ACTIVITY_INOUT) in which the wireless link is connected and there is the transmission/reception traffic, the state (DATA_ACTIVITY_NONE) in which the wireless link is connected but there is no transmission/reception traffic, and the state (DATA_ACTIVITY_OUT) in which the wireless link is connected and there is only the transmission traffic, the terminal device 100 transfers the keep-alive message through the connected data call. Moreover, in the state in which the basic period designated to the specific application has come, in the case of the data call unconnected state, that is, the state (DATA_ACTIVITY_DORMANT) in which there is the data connection but the wireless link is not connected, the terminal device 100 performs a new data call connection to transfer the keep-alive message through the corresponding data call.

Thereafter, the server device 200 transfers an ACK message to the terminal device 100 in response to reception of the keep-alive message transferred from the terminal device 100 (S360).

Preferably, the server device 200 transfers the ACK message to the terminal device 100 in correspondence to the keep-alive message received from the terminal device 100 according to the detection period corresponding to the time prior to the basic period designated to the specific application, or the basic period designated to the specific application, thereby replying to the terminal device 100 that the driving state of the specific application has been recognized.

Hereinafter, a method of operating the terminal device 100 according to another embodiment of the present disclosure will be described with reference to FIG. 6.

First, a current state of the terminal device is determined according to period information designated to an embedded specific application (S410 to S440).

Preferably, a state determining unit 110 determines period information designated to the embedded specific application, that is, a basic period designated to notify of a driving state of the specific application, and set a detection period corresponding to a time prior to the basic period on the basis of the determined basic period.

Moreover, the state determining unit 110 determines the current state of the terminal device 100, that is, a data call connection state according to the set detection period. In this regard, the terminal device 100 determines the data call connection state through an Application Programming Interface (API) supported by a platform, for example, Android or Windows, loaded for an operation of the terminal device.

For example, when the basic period corresponding to the period information designated to the specific application is set to a time interval of 50 minutes, the state determining unit 110 sets five minutes before the basic period passes as a detection period, and determine the data call connection state once, continuously, or by the number of times being set, according to the detection period through the API supported by the platform loaded for the operation of the terminal device.

In this event, the determined data call connection state is classified into a data call connected state and a data call unconnected state. The data call connected state includes a state (DATA_ACTIVITY_IN) in which a wireless link is connected and there is only reception traffic, a state (DATA_ACTIVITY_INOUT) in which a wireless link is connected and there is transmission/reception traffic, a state (DATA_ACTIVITY_NONE) in which a wireless link is connected but there is no transmission/reception traffic, and a state (DATA_ACTIVITY_OUT) in which a wireless link is connected and there is only transmission traffic. The data call unconnected state includes a state (DATA_ACTIVITY_DORMANT) in which there is a data connection but a wireless link is not connected.

Then, when it is determined that the current state corresponds to the data call connection state, a keep-alive message is transferred to a server device 200 (S450, S490, and S500).

Preferably, when it is determined through the API supported by the platform that the current state corresponds to the data call connection state, an application interworking unit 120 transfers the keep-alive message corresponding to the specific application through the connected data call to notify the server device 200 of the driving state of the specific application, and receive the ACK message corresponding to the keep-alive message from the server device 200.

Meanwhile, when the basic period designated to the specific application has come, the application interworking unit 120 transfers the keep-alive message through the data call or a new data call connection (S460 to S500).

In other words, in the state in which the basic period designated to the specific application has come, in the case of the data call connected state, that is, the state (DATA_ACTIVITY_IN) in which the wireless link is connected and there is only the reception traffic, the state (DATA_ACTIVITY_INOUT) in which the wireless link is connected and there is the transmission/reception traffic, the state (DATA_ACTIVITY_NONE) in which the wireless link is connected but there is no transmission/reception traffic, and the state (DATA_ACTIVITY_OUT) in which the wireless link is connected and there is only the transmission traffic, the application interworking unit 120 transfers the keep-alive message through the connected data call. Moreover, in the state in which the basic period designated to the specific application has come, in the case of the data call unconnected state, that is, the state (DATA_ACTIVITY_DORMANT) in which there is the data connection but the wireless link is not connected, the application interworking unit 120 performs a new data call connection to transfer the keep-alive message through the corresponding data call.

As described above, according to the concurrent call avoidance system in accordance with the another embodiment of the present disclosure, in transferring the keep-alive message for the sake of maintaining the session between the terminal device and the server device, when the data call connection state is determined prior to the set period for transferring the keep-alive message, the keep-alive message is transferred, whereby an attempt for the data call connection is minimized so that network loads can be reduced.

According to the embodiments of the present disclosure, when it is determined that the current state of the terminal device does not correspond to the voice call connection state, the keep-alive message for the sake of maintaining the session between the terminal device and the server device is transferred to the server device so that a concurrent call (or Multi-RAB) state in which a voice call and a data call are simultaneously performed is minimized, in which a voice call drop phenomenon due to an increase in the concurrent call is prevented, and thus a deterioration of a voice call quality is reduced. According to the embodiments of the present disclosure, in transferring the keep-alive message for the sake of maintaining the session between the terminal device and the server device, when the data call connection state is determined prior to the set period configured to transfer the keep-alive message, the keep-alive message is transferred so that an attempt for the data call connection is minimized, which reduces network loads.

Meanwhile, the method or the algorithm which has been described in regard to the embodiments of the present disclosure proposed herein are realized in the form of hardware, a software module executed by a processor, or a combination of the hardware and the software module. Some embodiments as described above are implemented in the form of one or more program commands that are read and executed by a variety of computer systems and be recorded in any non-transitory, computer-readable recording medium. The computer-readable recording medium includes a program command, a data file, a data structure, etc. alone or in combination. The program commands written to the medium are designed or configured especially for the at least one embodiment, or known to those skilled in computer software. Examples of the computer-readable recording medium include magnetic media such as a hard disk, a floppy disk, and a magnetic tape, optical media such as a CD-ROM and a DVD, magneto-optical media such as an optical disk, and a hardware device configured especially to store and execute a program, such as a ROM, a RAM, and a flash memory. Examples of a program command include a premium language code executable by a computer using an interpreter as well as a machine language code made by a compiler. The hardware device is configured to operate as one or more software modules to implement one or more embodiments of the present disclosure. In some embodiments, one or more of the processes or functionality described herein is/are performed by specifically configured hardware (e.g., by one or more application specific integrated circuits or ASIC(s)). Some embodiments incorporate more than one of the described processes in a single ASIC. In some embodiments, one or more of the processes or functionality described herein is/are performed by at least one processor which is programmed for performing such processes or functionality.

The above description merely corresponds to an example and is variously modified without departing from the scope of the claimed invention by those skilled in the art. Accordingly, various exemplary embodiments of the present disclosure is not limited thereto, and those skilled in the art will appreciate that various modifications, additions and substitutions are possible, without departing from the scope and spirit of the claimed invention as disclosed in the accompanying claims. Specific terms used in this disclosure and drawings are used for illustrative purposes and not to be considered as limitations of the present disclosure.

The invention claimed is:

1. A terminal device, comprising:
a state determining unit, comprising one or more processors and/or application-specific integrated circuits (ASICs), configured to
determine period information of a transfer period, the period information designated to a specific application, wherein the terminal device designates the transfer period to transfer one or more periodic messages, wherein the periodic messages are to be repeatedly transferred to a server during the transfer period, and indicates whether to keep maintaining a session of a data call related to the specific application,
set a detection period to detect a connection of a voice call, wherein the detection period is set, based on the determined period information of the transfer period, to be an interval having a specific time predetermined prior to and shorter than the transfer period, wherein the terminal device designates the periodic messages to notify the server of whether to keep maintaining the session of the data call established between the terminal device and the server, and
determine, during the detection period, whether a current connection state is in a voice call connected state or whether the current connection state is in a state of a data call connected state in order to thereby transfer one or more periodic messages if the current connection state is not in the voice call connected state, and skip transferring any periodic messages indicating whether to keep maintaining the session of the data call if the current connection state is in the voice call connected state; and
an application interworking unit, comprising one or more processors and/or application-specific integrated circuits (ASICs), configured to
determine, during the transfer period, whether the current connection state is the voice call connected state, and transfer the periodic messages through the data call when the state determining unit determines that the current connection state is in a state of the voice call connected state, and
skip transferring, at a further transfer period other than the transfer period corresponding to the period information, any periodic messages indicating whether to keep maintaining the session of the data call related to the specific application, when the state determining unit determines that the current connection state is in a state of the voice call connected state during the session of the data call, in order to minimize simultaneously performing multiple radio access bearer connection.

2. The terminal device of claim 1, wherein the application interworking unit is configured to transfer the periodic messages to the server device during the transfer period, irrespective of whether the state determining unit determines that the voice call is connected or not.

3. The terminal device of claim 1, wherein, during the transfer period, the application interworking unit is configured to transfer the periodic messages to the server device through another connected data call of another session established between the terminal and the server
when the state determining unit determines that the current connection state is not in a state of the data call connected state.

4. A method of avoiding a concurrent call, the method performed by a terminal device and comprising:
determining period information of a transfer period, the period information designated to a specific application, wherein the terminal device designates the transfer period to transfer one or more periodic messages, wherein the periodic messages are to be repeatedly transferred to a server during the transfer period, and indicates whether to keep maintaining a session of a data call related to the specific application;
setting a detection period to detect a connection of a voice call, wherein the detection period is set, based on the determined period information of the transfer period, to be an interval having a specific time predetermined prior to and shorter than the transfer period, wherein the terminal device designates the periodic messages to notify the server of whether to keep maintaining the session of the data call established between the terminal device and the server;
determining, during the detection period, whether a current connection state is in a voice call connected state or whether the current connection state is in a data call connected state in order to there transfer one or more periodic messages if the current connection state is not in the voice call connected state, and skipping transferring any periodic messages indicating whether to keep maintaining the session of the data call if the current connection state is in the voice call connected state;
determining, during the transfer period, whether the current connection state is in the voice call connected state, and transferring the periodic message through the data call when the current connection state is determined to be the voice call connected state,
wherein the transferring of the periodic messages further comprises
skipping transferring, at a further transfer period other than the transfer period corresponding to the period information, any periodic messages indicating whether to keep maintaining the session of the data call related to the specific application, when the current connection state is determined to be in a state of the voice call connected state during the session of the data call, in order to minimize simultaneously performing multiple radio access bearer connection; and receiving an acknowledgement message transferred by the server device in response to the periodic messages.

5. A method of operating a terminal device, the method performed by the terminal device and comprising:

determining period information of a transfer period, the period information designated to a specific application, wherein the terminal device designates the transfer period to transfer one or more periodic messages, wherein the periodic messages are to be repeatedly transferred to a server during the transfer period, and indicates whether to keep maintaining a session of a data call related to the specific application;

setting a detection period to detect a connection of a voice call, wherein the detection period is set, based on the determined period information of the transfer period, to be an interval having a specific time predetermined prior to and shorter than the transfer period, wherein the terminal device designates the periodic messages to notify the server of whether to keep maintaining the session of the data call established between the terminal device and the server;

determining, during the detection period, whether a current connection state is in a state of a voice call connected state or whether the current connection state is in a state of a data call connected state in order to thereby transfer one or more periodic messages if the current connection state is not in the voice call connected state, and skipping transferring any periodic messages indicating whether to keep maintaining the session of the data call if the current connection state is in the voice call connected state; and determining, during the transfer period, whether the current connection state is in a state of the voice call connected state, and transferring the periodic messages through the data call when the state determining unit determines that the current connection state is in a state of the voice call connected state, wherein the method further comprises skipping transferring, at a further transfer period other than the transfer period corresponding to the period information, any periodic messages indicating whether to keep maintaining the session of the data call related to the specific application, when the current connection state is determined to be in a state of the voice call connected state during the session of the data call, in order to minimize simultaneously performing multiple radio access bearer connection.

6. The method of claim 5, wherein the transferring comprises transferring the periodic messages to the server device at the transfer period, irrespective of whether or not it is determined in the determining of the connection state that the voice call is connected.

7. The method of claim 5, wherein the transferring further comprises transferring, during the transfer period, the periodic messages to the server device through another connected data call of another session established between the terminal and the server when it is determined in the determining of the connection state that the current connection state is not in a state of the data call connected state.

* * * * *

UNITED STATES PATENT AND TRADEMARK OFFICE
CERTIFICATE OF CORRECTION

PATENT NO. : 9,750,073 B2
APPLICATION NO. : 14/224492
DATED : August 29, 2017
INVENTOR(S) : Namgun Kim et al.

Page 1 of 1

It is certified that error appears in the above-identified patent and that said Letters Patent is hereby corrected as shown below:

In the Claims

Claim 1: Line 43, Column 13:
"indicates" should read "indicate"

Claim 4: Line 38, Column 14:
"indicates" should read "indicate"

Claim 5: Line 19, Column 15:
"indicates" should read "indicate"

Signed and Sealed this
Seventh Day of November, 2017

Joseph Matal
*Performing the Functions and Duties of the*
*Under Secretary of Commerce for Intellectual Property and*
*Director of the United States Patent and Trademark Office*